Figure 3:
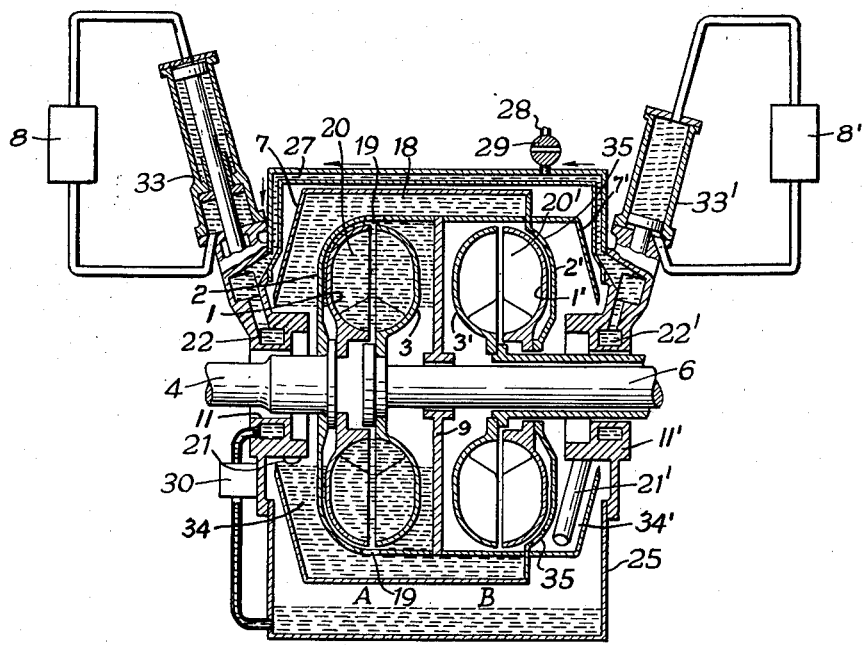

March 7, 1961  H. SINCLAIR  2,973,626
HYDRAULIC TURBO-COUPLINGS
Original Filed March 31, 1954
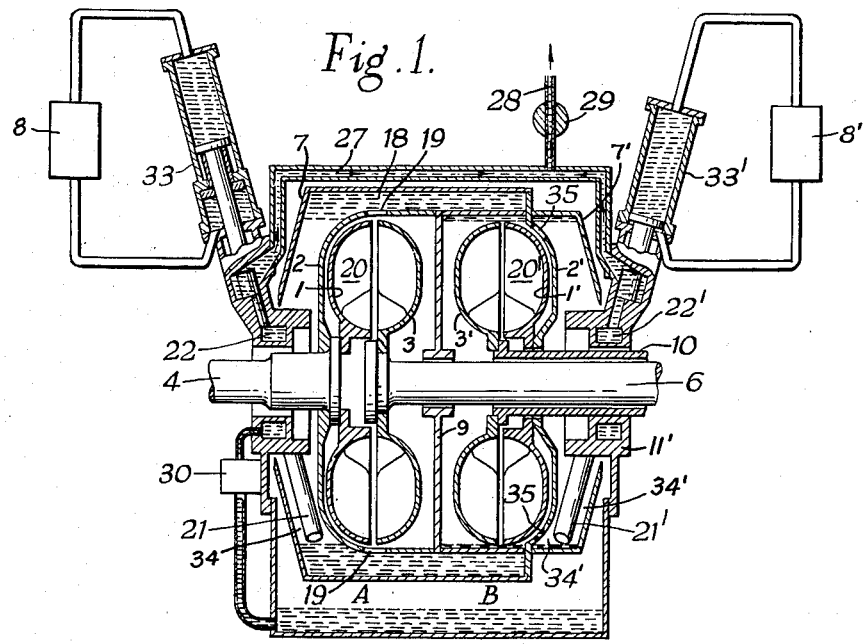
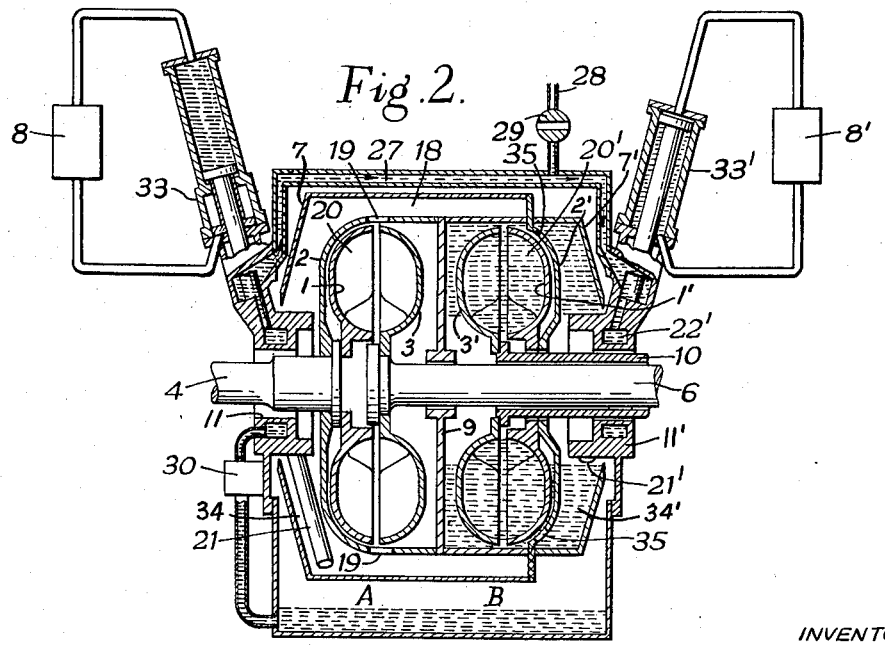
INVENTOR
Harold Sinclair
BY
Benjamin Sweedler
ATTORNEY March 7, 1961  H. SINCLAIR  2,973,626
HYDRAULIC TURBO-COUPLINGS
Original Filed March 31, 1954  2 Sheets-Sheet 2

INVENTOR
Harold Sinclair
BY
Benjamin Sweedler
ATTORNEY

United States Patent Office 2,973,626
Patented Mar. 7, 1961

2,973,626

HYDRAULIC TURBO-COUPLINGS

Harold Sinclair, Windsor, England
(5 Phillimore Gardens Close, London W. 8, England)

Original application Mar. 31, 1954, Ser. No. 420,173. Divided and this application Sept. 30, 1958, Ser. No. 764,340

Claims priority, application Great Britain Apr. 2, 1953

2 Claims. (Cl. 60—54)

This invention relates to power transmission systems comprising hydraulic turbo couplings of the Fottinger type wherein means are provided for varying the filling of the working circuit during operation of the turbo coupling to vary the torque transmitting capability thereof.

The invention arises from the requirement of providing a power transmission system incorporating two turbo couplings which are adapted for being operated in such manner that the working circuit of either coupling can be full with the working circuit of the other coupling empty, and additionally both working circuits can be simultaneously empty. Such a system may for example be employed for providing power transmission from a prime mover to a driven member through two power paths of different speed ratios.

In order that the invention may be clearly understood and readily carried into effect it will now be described in more detail with reference to the accompanying diagrammatic drawings, in which:

Figures 1 to 3 illustrate diagrammatically a power transmission system according to the invention, the respective figures showing different settings of the system, corresponding respectively to neutral, low speed drive and high speed drive.

Referring to the drawings, the power transmission system illustrated comprises two turbo couplings indicated generally at A and B respectively, comprising vaned impellers and vaned runners which define toroidal working circuits 20 and 20' as is well known in the art. The input shaft 4 is drivably connected to the impellers 1 and 1' respectively of the turbo couplings A and B, through annular casings 2 and 2'. The runner 3 of turbo coupling A is drivably connected to an output shaft 6, and the runner 3' of turbo coupling B is drivably connected to an output sleeve shaft 10. The turbo couplings are provided with scoop tubes 21 and 21' which are slidable longitudinally in fixed scoop tube housings 11 and 11' so that their scooping orifices can be inserted into or withdrawn from rotatable scoop chambers 34 and 34' which are formed by the annular casings 2 and 2' and further casings 7 and 7'. The casing 7, which is drivably connected to the shaft 4 for rotation therewith, through the casing 2 is formed to provide, in addition to the scoop chamber 34, a rotatable annular reservoir chamber 18 which in the example illustrated projects partly over the turbo coupling B. The turbo coupling B has no reservoir chamber. The reservoir 18 is in unrestricted communication with the scoop tube chamber 34 and working circuit 20 of turbo coupling A through large ports 19 in casing 2, and the scoop chamber 34' of turbo coupling B is in unrestricted communication with the working circuit of turbo coupling B through large ports 35 in the casing 2'. The scoop tubes 21 and 21' are operated respectively by means of hydraulic double-acting servo cylinders 33 and 33' controlled by servo control mechanism 8 and 8' respectively.

A partition 9 divides the space within the casing 2 and 2' into two working chambers, one for each of the turbo couplings A and B, it being observed that the term "working chamber" is to be distinguished from the term "working circuit" which refers to the toroidal space formed between the impeller and runner.

The rotatable annular reservoir chamber 18 is located radially outwardly relative to the working chambers of the turbo couplings, and has a volumetric capacity equal to that of the working chamber of turbo coupling B and of the scoop chamber 34'. A pump 30 delivers working liquid from a sump 25 to an annular duct 22 in the stationary scoop tube housing 11, the duct 22 communicating with the interior of the scoop tube 21. An annular duct in the stationary scoop tube housing 11' communicates with the interior of the scoop tube 21'. A pipe 27 interconnects the annular ducts 22 and 22', and a branch pipe 28 leading to the sump 25 is provided with a valve 29.

The arrangement shown is suitable for use with a change speed gear such that drive via input shaft 4, turbo coupling A and output shaft 6 provides high speed gear and drive via input shaft 4, turbo coupling B and output sleeve shaft 10 provides low speed gear.

Figure 1 shows the neutral condition, in which the scoop tube 21 is withdrawn from the reservoir chamber 18 but is fully inserted into its scoop chamber 34, and scoop tube 21' is fully inserted into its scoop chamber 34'. The reservoir chamber 18 is full of working liquid and both working circuits 20 and 20' are empty, surplus oil delivered by the pump 30 being returned to the sump 25 via the pipe 27 and branch pipe 28, the valve 29 being opened when the scoop tubes are set for the neutral condition.

To set the system for driving in low speed gear, the servo control mechanisms 8 and 8' are operated so that the hydraulic cylinders 33 and 33' function to insert the scoop tube 21 fully into the reservoir chamber 18, and to retract the scoop tube 21' from its scoop chamber 34'. Valve 29 is closed (Figure 2). The liquid in reservoir chamber 18 is thereby rapidly transferred to the turbo coupling B, via scoop tube 21, annular duct 22, pipe 27, annular duct 22' and scoop tube 21', thereby filling the working chamber and working circuit and scoop chamber of turbo coupling B. Power is now transmitted from input shaft 4 via turbo coupling B to the output shaft 10. The scoop tube 21 is thereupon retracted to the position shown in Figure 1, so that the reservoir chamber 18 is filled by working liquid delivered by the pump 30.

When it is thereafter required to drive in high speed gear via the output shaft 6, the servo control mechanisms 8 and 8' are operated to cause the hydraulic cylinders 33 and 33' to function so as to insert scoop tube 21' fully into its scoop chamber 34', and to fully retract the scoop tube 21 from its scoop chamber 34, as shown in Figure 3. Thereby, all the working liquid in turbo coupling B is transferred to coupling A, via scoop tube 21', annular duct 22', pipe 27, annular duct 22 and scoop tube 21. Since reservoir 18 is already full, the working circuit of turbo coupling A fills rapidly for the transmission of power from input shaft 4 to output shaft 6.

To change back to drive in low speed gear via sleeve shaft 10, the scoop tube 21 is inserted as far as the position shown in Figure 1, and the scoop tube 21' is fully withdrawn as shown in Figure 2, so that turbo coupling A is emptied and turbo coupling B is filled, by the transfer of the working liquid in coupling A to coupling B, via the scoop tube 21, annular duct 22, pipe 27, annular duct 22' and scoop tube 21. Reservoir chamber 18 remains full.

When the system is stopped, both scoop tubes 21 and 21' are set to the positions shown in Figure 1, and valve 29 is opened, so that both turbo couplings are emptied to the sump 25 but the reservoir chamber 18 remains full in readiness for rapid transfer of working liquid therefrom to turbo coupling B when it is again required to start in low speed gear, as in Figure 2.

This application is a divisional of application Serial No. 420,173, filed March 31, 1954.

I claim:

1. A power transmission system comprising two axially aligned turbo couplings supported in bearings within a casing; a sump in said casing; a duct having a pump therein for feeding working liquid from said sump to said turbo couplings; valve means for controlling the return of working liquid from said turbo couplings to said sump; each of said turbo couplings comprising a vaned impeller and a vaned runner which encloses a toroidal working circuit; casing means drivably connected to the impeller of each coupling for rotation therewith and forming a working chamber for the coupling, means forming an annular scoop chamber drivably connected to the impeller of each coupling for rotation therewith and in free fluid communication with the working chamber of its coupling, and an adjustable scoop tube for each scoop chamber having a scooping orifice and an outlet orifice; the impellers of said couplings being drivably connected to one another for rotation together; duct means interconnecting the outlet orifices of said scoop tubes; scoop tube adjusting means for the scoop tube in one of said couplings operable to adjust the scooping orifice of its scoop tube selectively into or out of its scoop chamber; a reservoir chamber, radially outwardly of the working chamber of said other coupling, drivably connected to the impeller of said other coupling for rotation therewith, in free fluid communication with the scoop chamber of said other coupling and having a volumetric capacity substantially equal to the volumetric capacity of the working chamber and scoop chamber of said one coupling; and scoop tube adjusting means for the scoop tube of said other coupling operable to adjust the scooping orifice of its scoop tube selectively into or out of its scoop chamber or into said reservoir.

2. A power transmission system comprising two axially aligned turbo couplings supported in bearings within a casing; a sump in said casing; a duct for feeding working liquid from said sump to said turbo couplings; valve means for controlling the return of working liquid from said turbo couplings to said sump; each of said turbo couplings comprising a vaned impeller and a vaned runner which enclose a toroidal working circuit, casing means drivably connected to the impeller of each coupling for rotation therewith and forming a working chamber for the coupling, means forming an annular scoop chamber drivably connected to the impeller of each coupling for rotation therewith and in free fluid communication with the working chamber of its coupling, and an adjustable scoop tube for each scoop chamber having a scooping orifice and an outlet orifice; the impellers of said couplings being drivably connected to one another for rotation together; duct means interconnecting the outlet orifices of said scoop tubes; scoop tube adjusting means for the scoop tube in one of said couplings operable to adjust the scooping orifice of its scoop tube selectively into or out of its scoop chamber; a reservoir chamber, radially outwardly of the working chamber of said other coupling, drivably connected to the impeller of said other coupling for rotation therewith, in free fluid communication with the scoop chamber of said other coupling and having a volumetric capacity substantially equal to the volumetric capacity of the working chamber and scoop chamber of said one coupling; scoop tube adjusting means for the scoop tube of said other coupling operable to adjust the scooping orifice of its scoop tube selectively into or out of its scoop chamber or into said reservoir; and a pump operative to supply working liquid from said sump to said reservoir chamber to refill said reservoir chamber when liquid therein has been transferred to the working chamber of said one coupling.

References Cited in the file of this patent

FOREIGN PATENTS 815,133    Germany _____ Sept. 27, 1951